Figure 1:
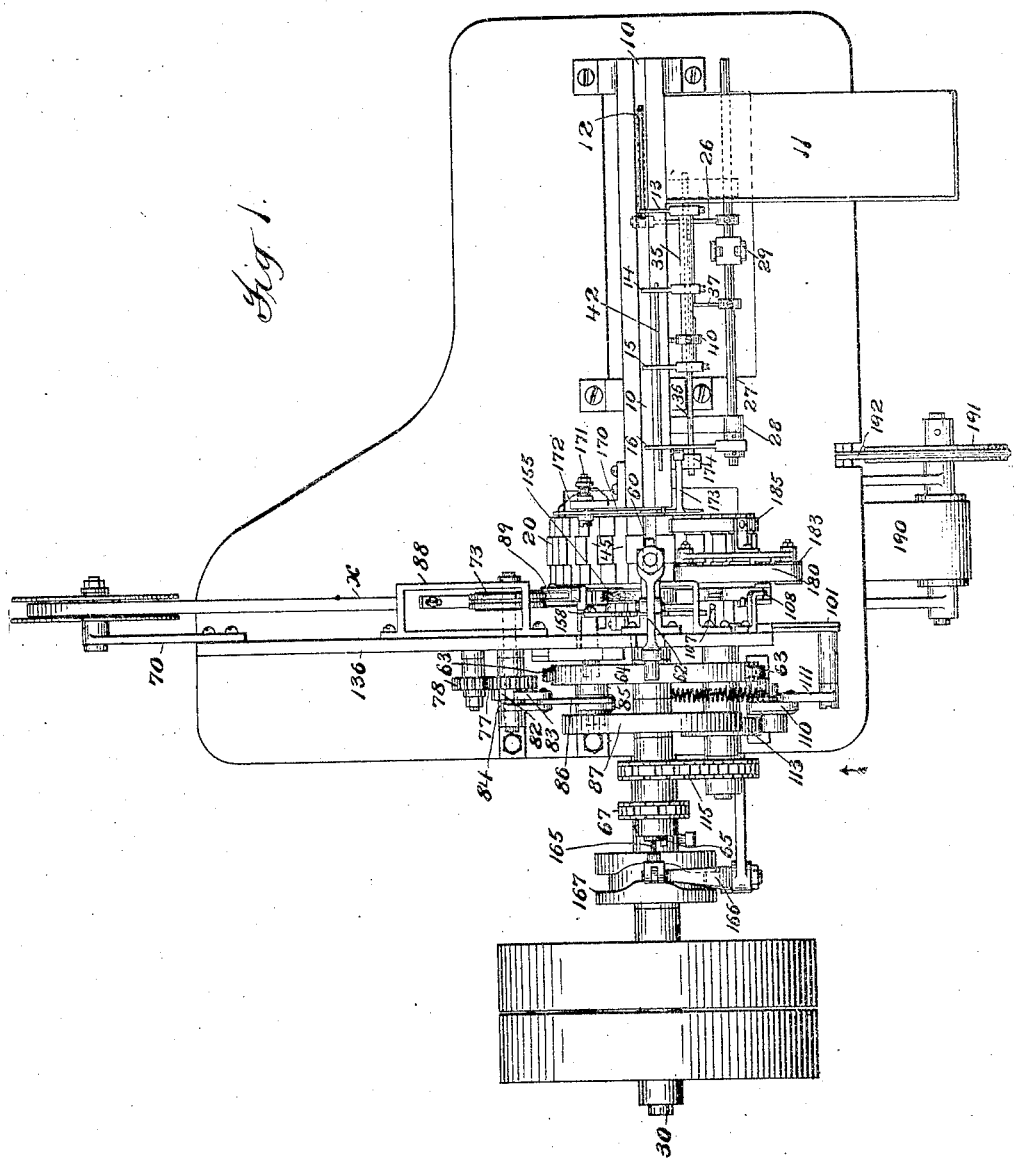

No. 840,004. PATENTED JAN. 1, 1907.
F. X. MALOCSAY.
MACHINE FOR APPLYING MOUTHPIECES TO CIGARETTES.
APPLICATION FILED JAN. 29, 1904.

9 SHEETS—SHEET 1.

Attest:
Jete Traves.
G. M. Borst

Inventor:
Frank X Malocsay
by Philipp Sawyer Rice & Kennedy

No. 840,004. PATENTED JAN. 1, 1907.
F. X. MALOCSAY.
MACHINE FOR APPLYING MOUTHPIECES TO CIGARETTES.
APPLICATION FILED JAN. 29, 1904.

9 SHEETS—SHEET 2.

No. 840,004. PATENTED JAN. 1, 1907.
F. X. MALOCSAY.
MACHINE FOR APPLYING MOUTHPIECES TO CIGARETTES.
APPLICATION FILED JAN. 29, 1904.

9 SHEETS—SHEET 3.

Attest:
Jas. Traves.
G. M. Borst.

Inventor:
Frank X. Malocsay
by Philipp, Sawyer, Rice & Kennedy
Atty.

No. 840,004. PATENTED JAN. 1, 1907.
F. X. MALOCSAY.
MACHINE FOR APPLYING MOUTHPIECES TO CIGARETTES
APPLICATION FILED JAN. 29, 1904.
9 SHEETS—SHEET 4.
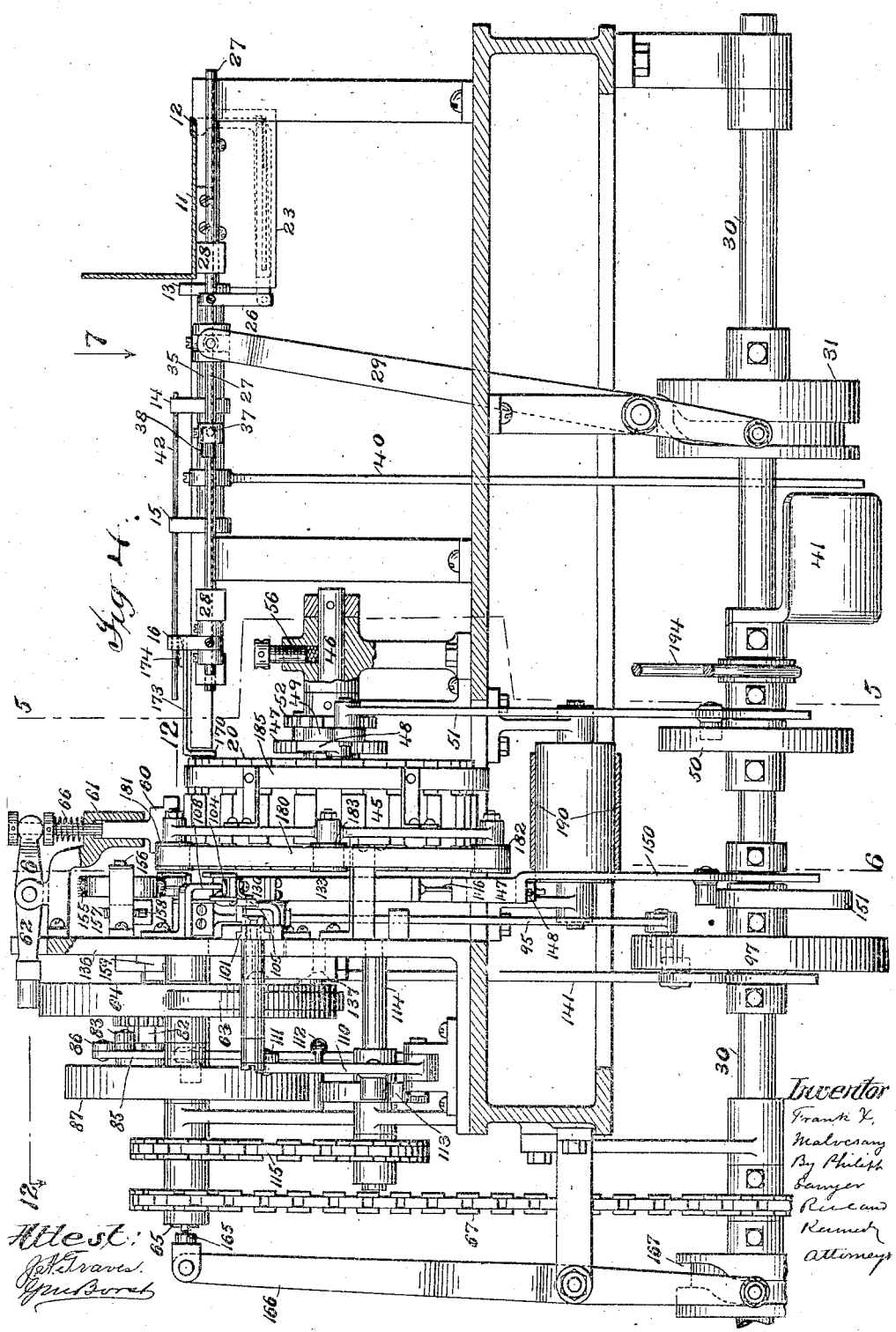

No. 840,004. PATENTED JAN. 1, 1907.
F. X. MALOCSAY.
MACHINE FOR APPLYING MOUTHPIECES TO CIGARETTES.
APPLICATION FILED JAN. 29, 1904.
9 SHEETS—SHEET 5.
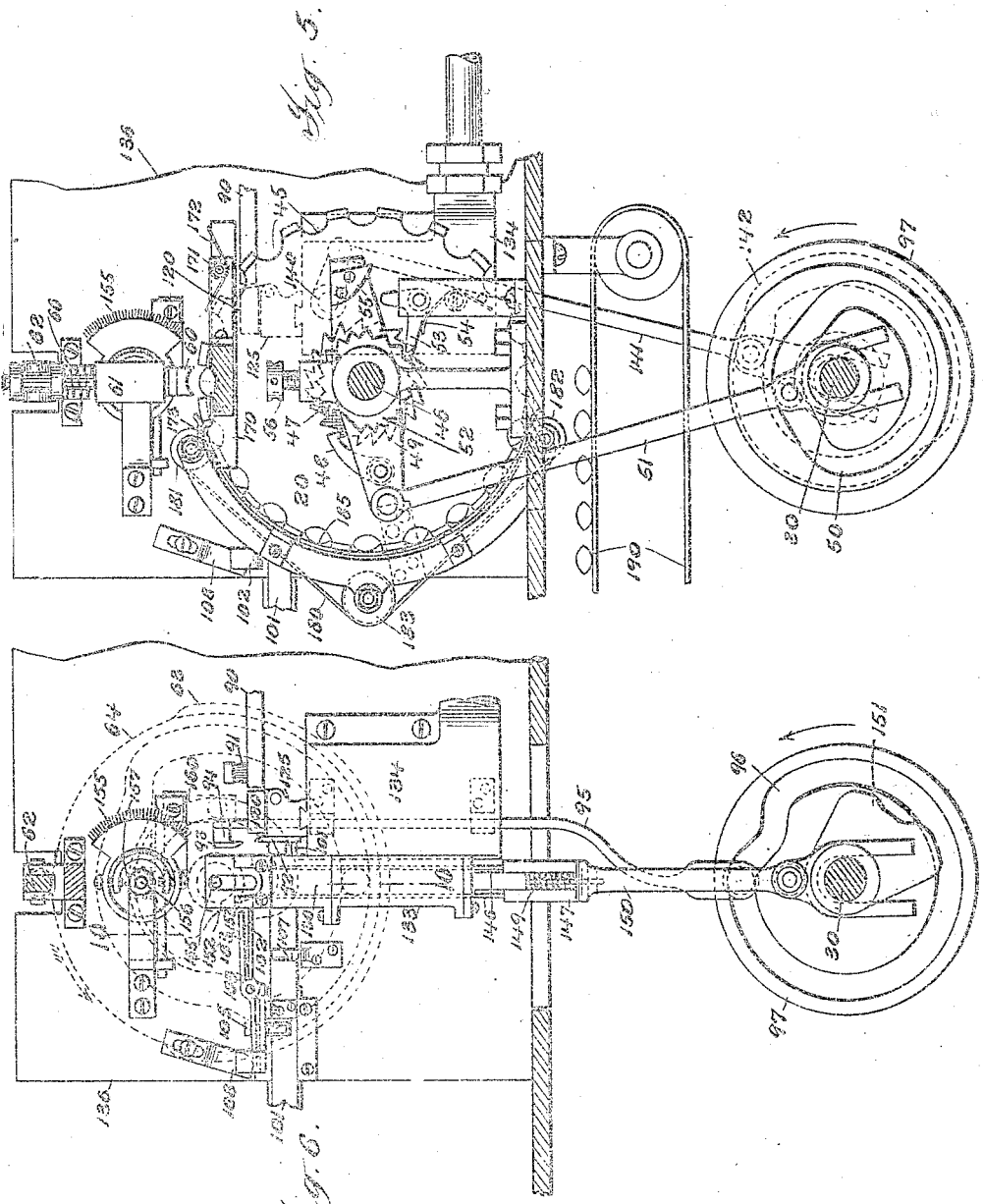

No. 840,004. PATENTED JAN. 1, 1907.
F. X. MALOCSAY.
MACHINE FOR APPLYING MOUTHPIECES TO CIGARETTES.
APPLICATION FILED JAN. 29, 1904.
9 SHEETS—SHEET 6.
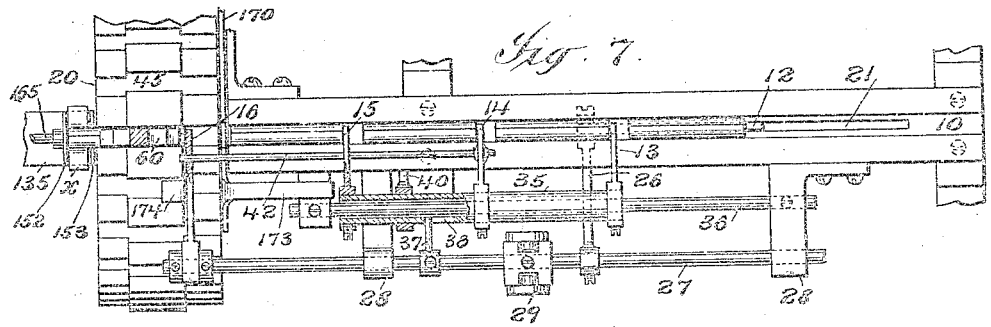
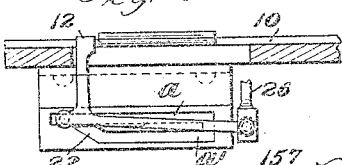
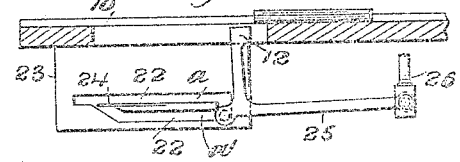
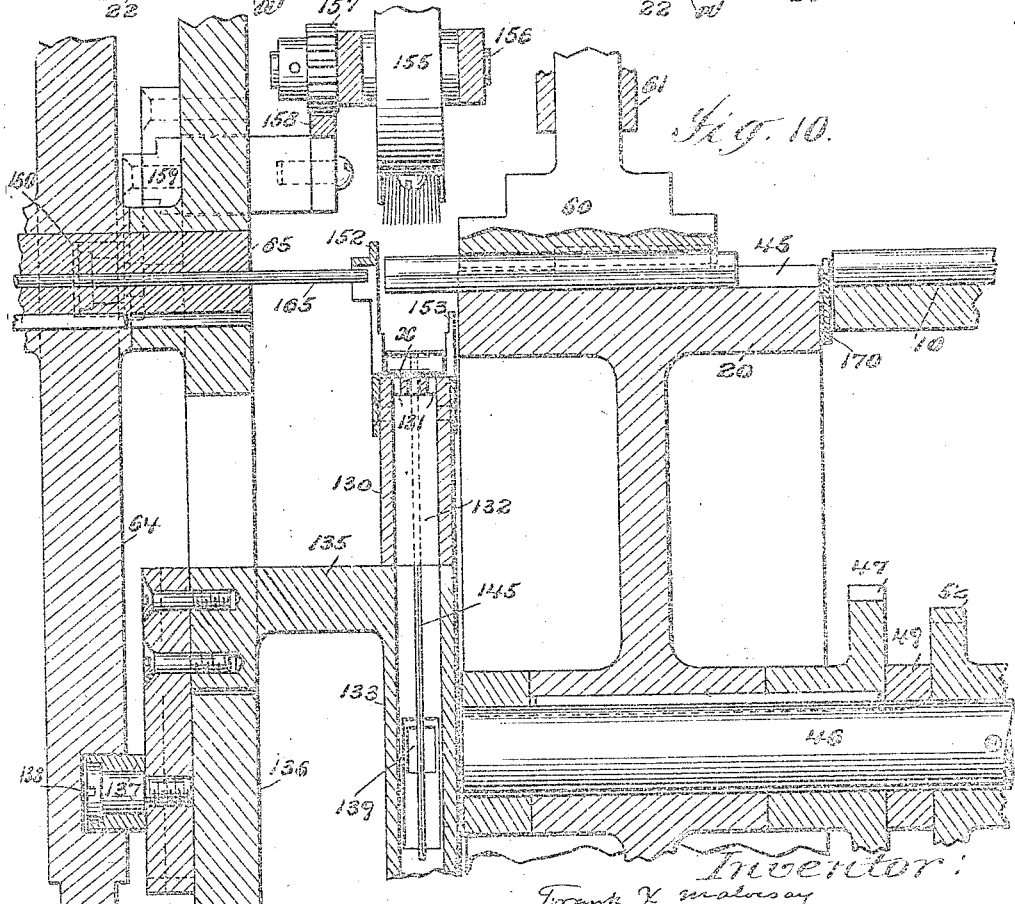

No. 840,004. PATENTED JAN. 1, 1907.
F. X. MALOCSAY.
MACHINE FOR APPLYING MOUTHPIECES TO CIGARETTES.
APPLICATION FILED JAN. 29, 1904.
9 SHEETS—SHEET 7.
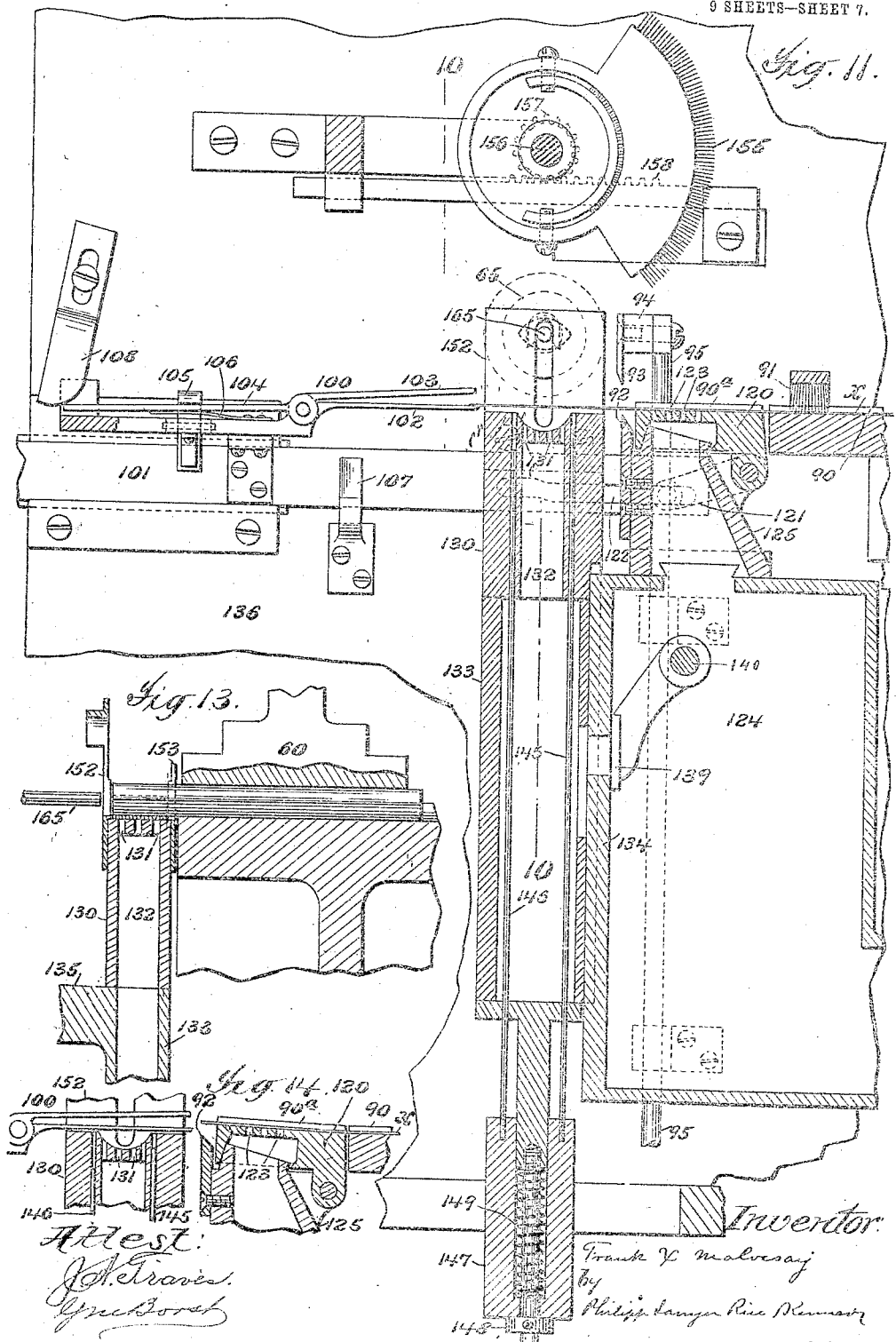

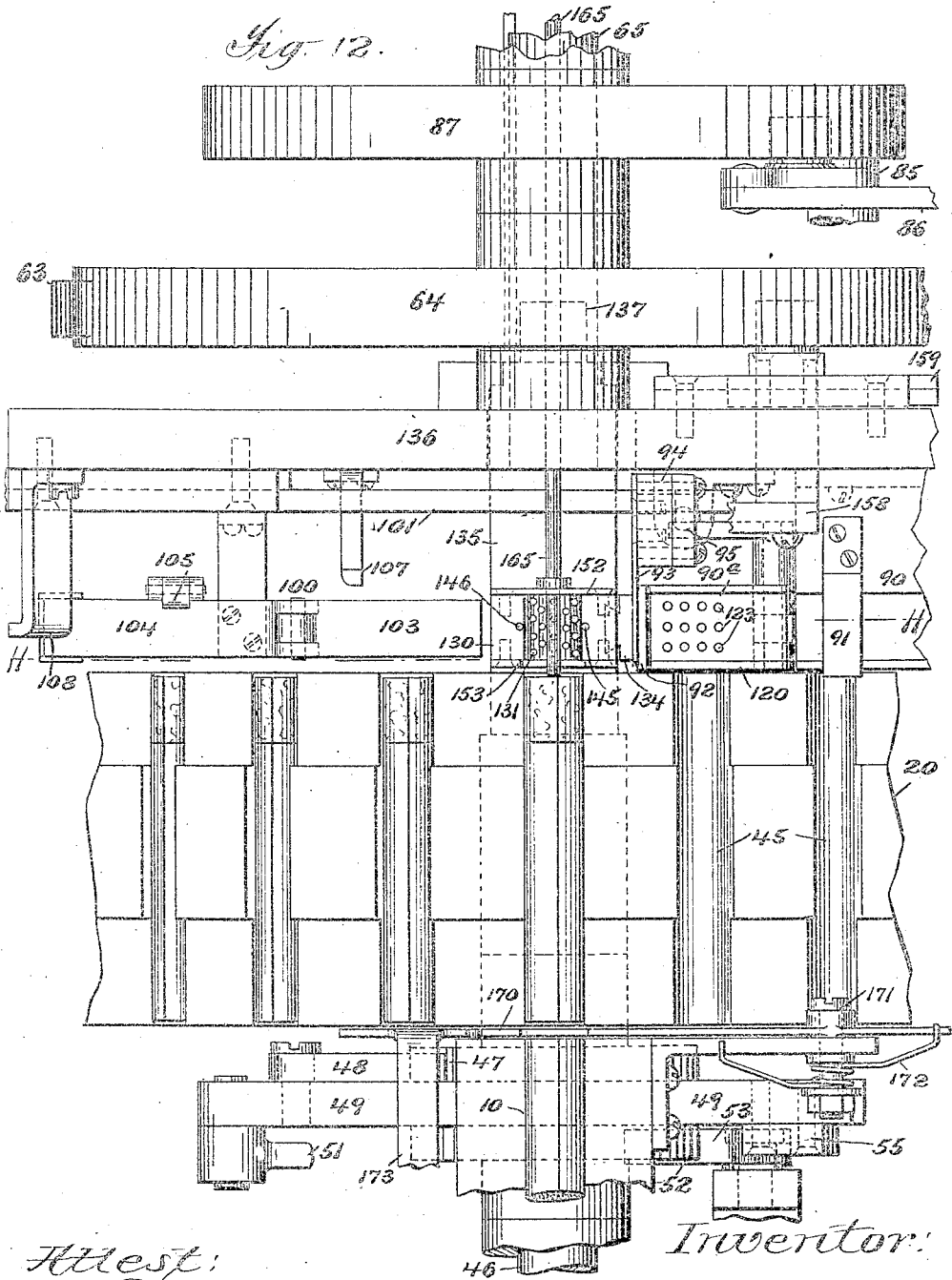

No. 840,004.
PATENTED JAN. 1, 1907.
F. X. MALOCSAY.
MACHINE FOR APPLYING MOUTHPIECES TO CIGARETTES.
APPLICATION FILED JAN. 29, 1904.
9 SHEETS—SHEET 9.
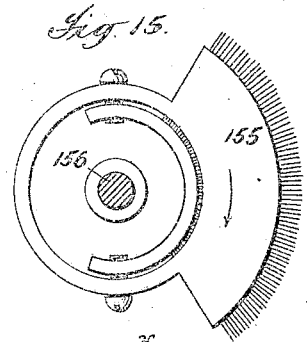
Fig. 15.
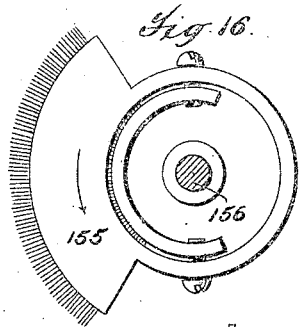
Fig. 16.
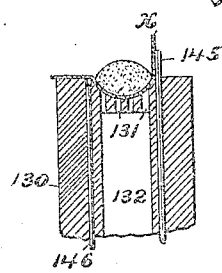
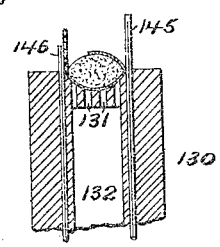
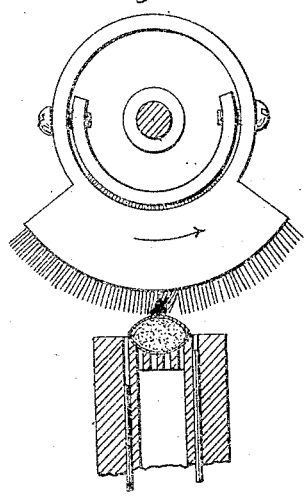
Fig. 17.
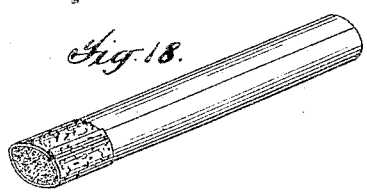
Fig. 18.
Inventor
Frank X Malocsay
By Philipp Sawyer Rice & Kennedy
Attys
Attest:
J. N. Travers
Geo. N. Borst

UNITED STATES PATENT OFFICE.

FRANK X. MALOCSAY, OF NEW YORK, N. Y., ASSIGNOR TO THE AMERICAN TOBACCO COMPANY, OF NEW YORK, N. Y., A CORPORATION OF NEW JERSEY.

MACHINE FOR APPLYING MOUTHPIECES TO CIGARETTES.

No. 840,004.     Specification of Letters Patent.     Patented Jan. 1, 1907.

Application filed January 29, 1904. Serial No. 191,096.

*To all whom it may concern:*

Be it known that I, FRANK X. MALOCSAY, a citizen of the United States, residing at New York city, county of New York, and State of New York, have invented certain new and useful Improvements in Machines for Applying Mouthpieces to Cigarettes, fully described and represented in the following specification and the accompanying drawings, forming a part of the same.

This invention relates to machines for providing cigarettes with exterior tips or mouthpieces of suitable material applied by folding a strip of mouthpiece material about the end of the cigarette, the material being secured to the cigarette by a suitable adhesive and the ends of the strip preferably overlapping slightly. Any suitable mouthpiece material may be employed—as, for example, sheet-cork or cork or metal foil or other suitable material applied to a backing of paper.

The invention aims to provide a practical machine of high capacity for applying such tips to cigarettes, which shall apply the tips accurately and securely and without injury to the cigarettes.

A full understanding of the invention can best be given by a detailed description of a preferred construction embodying the various features of the invention, and such a description will now be given in connection with the accompanying drawings, which show such a preferred construction.

Figure 2:
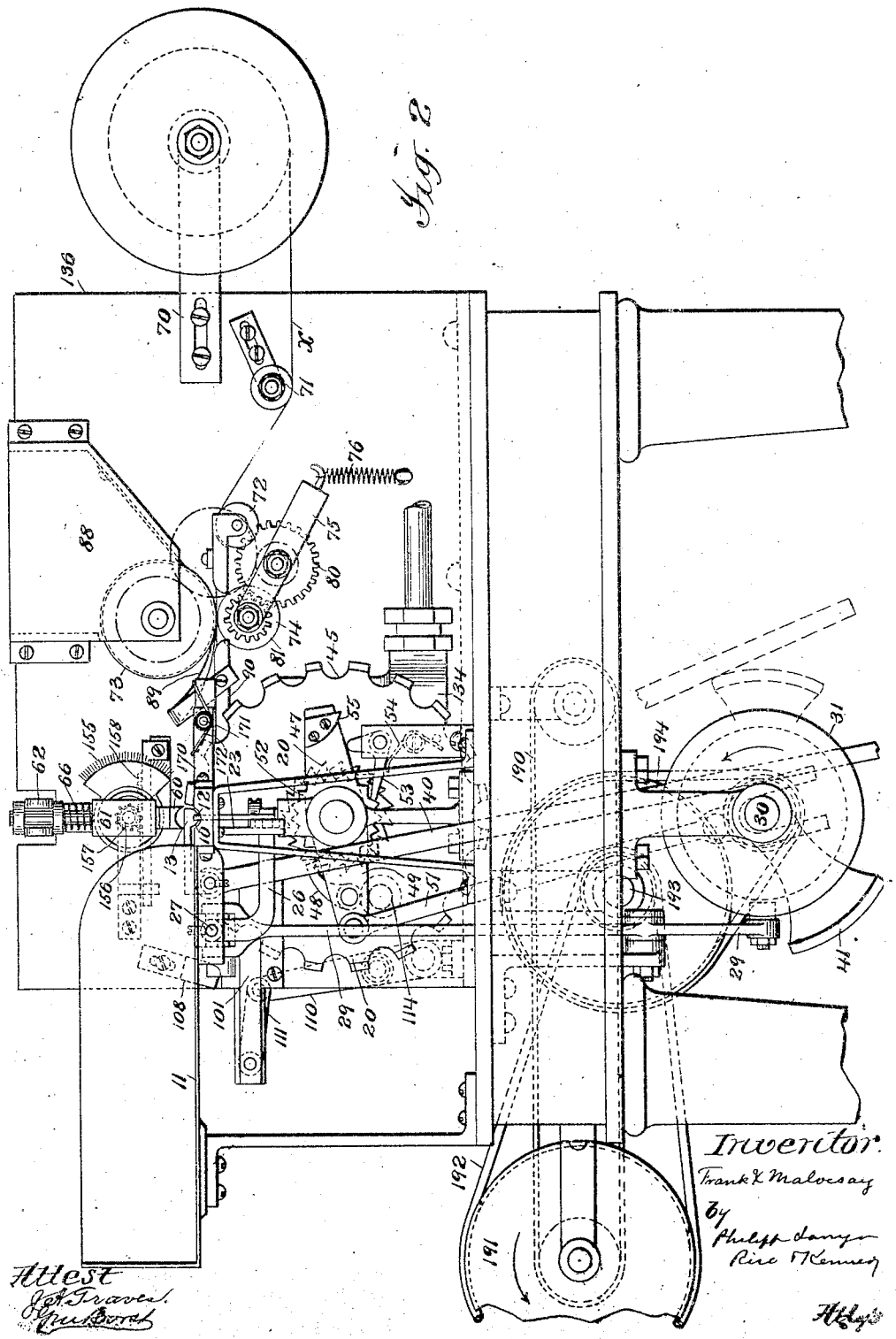
Figure 3:
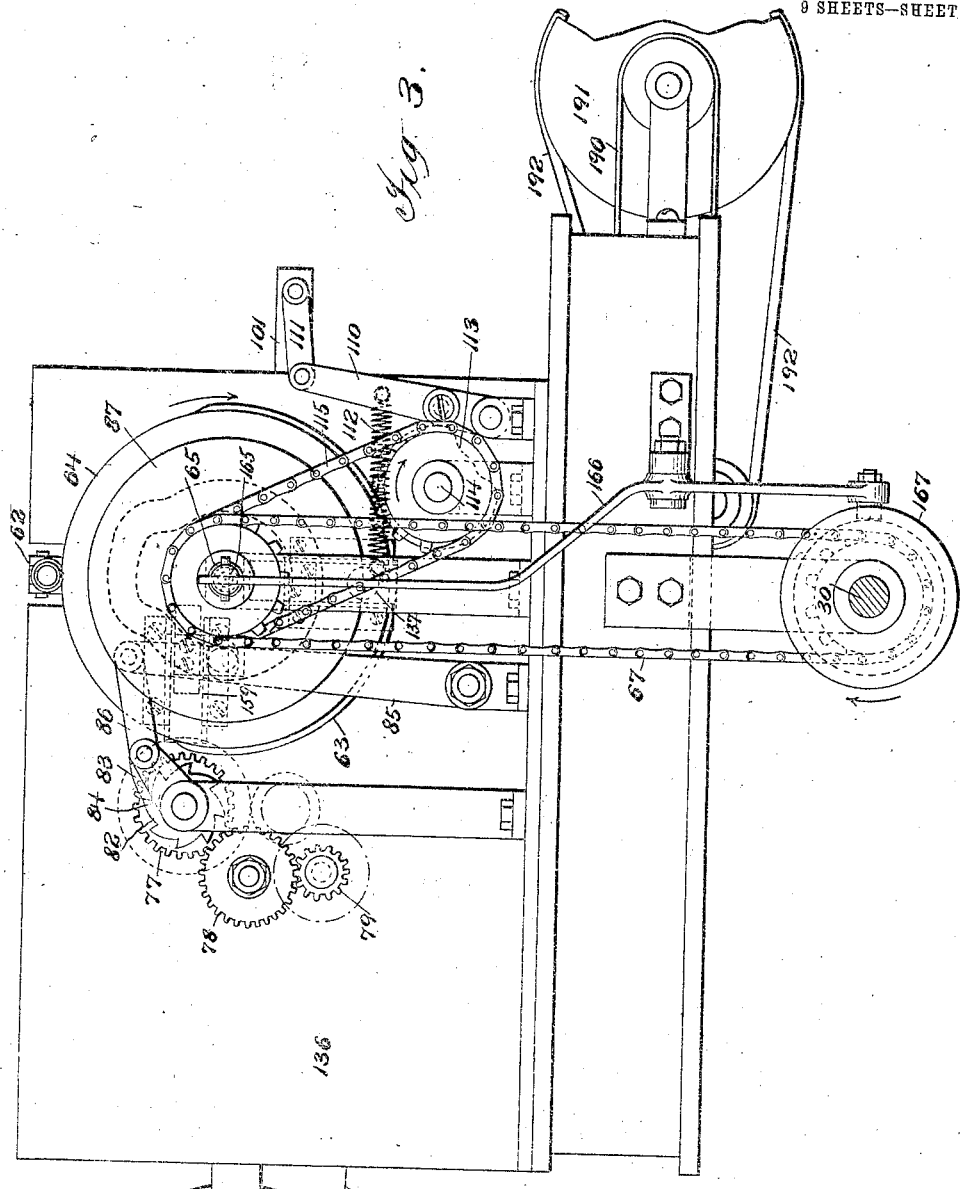

In said drawings, Figure 1 is a plan view of the machine. Fig. 2 is an end view, on an enlarged scale, looking from the right in Fig. 1. Fig. 3 is an end view looking from the left in Fig. 1. Fig. 4 is an elevation, partly in section, looking in the direction of the arrow in Fig. 1. Figs. 5 and 6 are sectional views taken on lines 5 and 6, respectively, of Fig. 4. Fig. 7 is a plan view, partly in section, of the cigarette-feeding device. Figs. 8 and 9 are detail views of a part of the feeding mechanism. Fig. 10 is a section taken on line 10 of Figs. 6 and 11 and on a further enlarged scale. Fig. 11 is a section taken on line 11 of Fig. 12. Fig. 12 is a plan view of parts of the wrapping and delivering mechanisms, partly in section, on line 12 of Fig. 4. Fig. 13 is a detail view of parts shown in Fig. 10, but showing the same in position after the mouthpiece material has been raised against the end of the cigarette. Fig. 14 is a sectional detail view of parts shown in Fig. 11, but in a different position. Figs. 15, 16, and 17 are detail views of the parts for applying the strip of mouthpiece material about the end of the cigarette and showing the parts in successive positions during the operation of applying the mouthpiece material. Fig. 18 shows a cigarette provided with a mouthpiece.

Any suitable means may be provided for feeding cigarettes into position to be tipped. As shown, (see especially Figs. 1, 2, 4, 7, 8, and 9,) the cigarettes are advanced endwise through a feedway 10 to the mouthpiece-applying mechanism. The cigarettes may be placed in the feedway by hand, a suitable feed-board 11 being preferably provided in position, so that the cigarettes may be successively drawn sidewise from the feed-board into the feedway 10. Each cigarette placed in the feedway 10 is advanced by a feeding-finger 12 a distance a little greater than the length of the cigarette. The finger 12 then returns for the next cigarette, and on its next forward movement the cigarette previously forwarded by it is further advanced through the feedway 10 by a feeding-finger 13, which then returns to engage and advance on its next forward movement the cigarette last advanced by the finger 12. A third feeding-finger 14 acts to advance the cigarettes from the position to which they are fed by the finger 13, and a fourth finger 15 acts to advance the cigarettes from the position to which they have been fed by the finger 14. From the position to which successive cigarettes are fed to the finger 15 they are advanced by a feeding-finger 16 from the feedway 10 on to a carrier 20, having an intermittent movement transversely to the feedway 10 and by which carrier the cigarettes are supported in position to have the mouthpiece material applied thereto and are then moved sidewise from the mouthpiece-applying means after having received their mouthpieces.

The feeding-finger 12 is arranged to operate through a slot 21 in the bottom of the feedway and is withdrawn from the feedway during its return movement, so that after having fed one cigarette it will not interfere on its return movement with the next one being placed in position. For this purpose the finger is guided in its reciprocating movement by a guiding-channel 22 in a bracket-plate 23, the finger being provided with a pin which extends into said channel, as shown in Figs. 8 and 9. This guiding-channel is formed with an upper run $a$ for guiding the feeding-finger on its forward or feed stroke and an underrun $a'$ for guiding the feeding-finger on its return stroke, said runs being connected at one end so as to permit the finger to drop from the upper run to the under run at the end of its feeding stroke and being connected at the other end by an inclined portion for raising the finger as it approaches the end of its return movement, a yielding leaf or support 24 being provided for supporting the pin as it passes the inclined portion of the channel on the forward movement of the finger. A forwardly-projecting arm 25 of the finger 12 is pivotally connected with an arm 26, extending from a rod 27, mounted in brackets 28, so as to be movable endwise. This rod 27 is reciprocated by a lever 29, the upper end of which is pivotally connected with the rod 27 and the lower end of which carries a roll running in the groove of a cam 31 on the cam-shaft 30.

The feeding-fingers 13, 14, and 15 are carried by a sleeve 35, mounted on a rod 36, extending parallel to the rod 27, the sleeve being free to reciprocate longitudinally on said rod and also to rock thereon. The sleeve is reciprocated longitudinally to give the feeding-fingers their feeding and return movements by means of a pin 37 extending from the reciprocating rod 27 and extending into an opening 38 in the sleeve, as shown in Figs. 4 and 7. When the sleeve makes its movement to the left in Figs. 1 and 7 to give the feeding-fingers their feeding movement, the fingers extend into the feedway in position to engage the cigarettes lying therein, as shown in Fig. 2. For the return movement of the feeding-fingers the sleeve 35 is rocked to raise the fingers sufficiently to clear the cigarettes lying in the feedway, the opening 38 being of sufficient width circumferentially of the sleeve to permit such oscillation of the sleeve. The sleeve is given its oscillating movement in the construction shown by means of a lever 40, carried by the sleeve and extending downward into position to be engaged by a leaf-cam 41, carried by the shaft 30. This cam is timed to throw the lever 40 to the position indicated by dotted lines in Fig. 2 for the return movement of the feeding-fingers and is extended longitudinally of the shaft 30 sufficiently to hold the lever 40 in such position until the feeding-fingers have been returned sufficiently to clear the rear ends of the cigarettes lying in the feedway 10. The rod 40 then falls back to the position shown by full lines in Fig. 2, thereby returning the feeding-fingers to position to engage the cigarettes in the feedway on their next feeding movement.

The feeding-finger 16 is carried by the reciprocating rod 27 and is arranged so that it may be raised from feeding position for its return movement and lowered into feeding position before making its feeding movement, being for this purpose preferably pivotally mounted on the rod 27 and held from moving longitudinally thereon by collars, as shown in Fig. 7. The finger is raised for its return movement by means of a rod 42, carried by the feeding-fingers 14 and 15, extending through an opening in the finger 16.

It is desirable to give the feeding-finger 12 a slightly greater movement than is necessary for the feeding-fingers 13, 14, and 15 in order that there may be a longer space in which the cigarettes may be deposited by the operator, thus avoiding the necessity of great accuracy on the part of the operator in placing the cigarettes in the feedway. It is desirable also to give the feeding-finger 16 a greater movement than is necessary for the feeding-fingers 13, 14, and 15 in order that the cigarettes may be properly positioned on the carrier 20. For this purpose the rod 27 is given a reciprocating movement sufficient to give the desired movement to the feeding-fingers 12 and 16, and the opening 38 in the sleeve 35 is lengthened to allow a certain amount of lost motion between the pin 37 and the sleeve, so that the reciprocation of the sleeve will be of the extent desired for the feeding-fingers 13, 14, and 15 and less than the movement of the rod 27.

By providing the intermediate feeding-fingers 13, 14, and 15 the feeding-finger 12 may be located at a distance from the tipping mechanism convenient for the placing of the cigarettes in the feedway by the operator. It will be understood, however, that such intermediate feeding-fingers might be omitted or that a different member might be provided.

The carrier 20 is preferably a rotating carrier formed by a wheel having a periphery of a width substantially equal to the length of the cigarettes and provided with a number of grooves or recesses 45 extending parallel with the axis of the wheel and forming pockets or holders to receive the cigarettes. The carrier is rotated intermittently, each movement being sufficient to bring one of the recesses opposite the end of the feedway 10. Any suitable means may be provided for giving the carrier such movement. As shown, (see Figs. 2, 4, and 5,) the carrier-shaft 46 is provided with a ratchet-wheel 47, through which the carrier is rotated by a pawl 48, carried by a lever 49, pivotally mounted on the shaft 46 and oscillated by a cam 50 on the cam-shaft 30, acting through a pitman 51, having one end connected to the lever and having its other end forked to straddle the shaft 30 and carrying a roll running in the groove of the cam 50. To prevent overthrow of the carrier and secure accurate positioning thereof, a second toothed wheel 52 is provided on the shaft 46, and a stop-pawl 53 is provided to engage such wheel and stop the rotation of the carrier at the proper point. The stop-pawl 53 is held in operative position by a spring 54 and is thrown out of operative position to permit forward movement of the carrier by a cam 55, carried by the extended end of the lever 49, said cam engaging an arm of the pawl and being formed so as to throw the pawl out of operative position as the pawl 48 is carried into position for each feeding movement and to hold it out of operative position long enough to permit a tooth of the wheel 52 to pass the end of the pawl 53. A suitable friction device, such as shown at 56 in Fig. 4, is also preferably provided to hold the carrier in position during the return movement of the pawl 48.

The carrier 20 being moved one step for each rotation of the cam-shaft 30, a pocket 45 is presented in position to receive each cigarette advanced from the feedway by the feeding-finger 16. As before stated, the mouthpiece material is applied to the ends of the cigarettes while they are supported by this carrier. Preferably and as shown the applying means is arranged to apply the mouthpiece to the cigarettes while the pocket holding the same is still in line with the feedway 10. The cigarettes are positioned on the carrier with the end to be tipped extending beyond the carrier, as shown in Figs. 7 and 10, being fed to this position by the feeding-finger 16, the feeding-finger being given a sufficient movement to push the cigarette to the desired position on the carrier, and thus acting as a positioning device for bringing the cigarettes into position to have mouthpieces applied thereto.

For holding the cigarettes securely in position in the pocket 45 while the mouthpiece material is being applied to the end thereof a holding device is provided for coacting with the pocket 45, a single holding device being preferably provided for coacting with the successive pockets as the movement of the carrier brings them into position. For this purpose a reciprocating plunger 60 is provided in position to bear against the top of the cigarette in the pocket 45 opposite the feedway 10. The plunger 60 is mounted to slide vertically in a bracket 61 and is reciprocated by a lever 62, having forked end-engaging collars on the upwardly-extending plunger-rod and actuated by a peripheral cam 63 on a cam-disk 64, mounted on a shaft 65, said cam 63 engaging the opposite end of the lever 62 to move the lever and plunger against the tension of a spring 66. The shaft 65 is driven from the cam-shaft 30 by a sprocket-chain 67, running on sprocket-wheels on the two shafts, said sprocket-wheels being of equal size, so that the shaft 65 will make one rotation for each rotation of the shaft 30, and the cam 63 is timed so that the holding-plunger will move downward into holding position after the cigarette has been fed into position on the carrier and will be raised after the mouthpiece has been applied to the cigarette.

Any suitable means may be provided in connection with other features of the invention for applying the mouthpiece material to the end of the cigarette and for supplying the mouthpiece material to the applying means. Preferably, however, applying and feeding means, such as shown, are employed and form in themselves parts of the invention. By such applying means a strip of mouthpiece material is folded about the end of a cigarette by having an intermediate portion of the strip applied to the cigarette and the extending portions of the strip then folded about the cigarette, the strip being preferably of a length such that the meeting ends thereof will slightly overlap. The individual pieces or strips of mouthpiece material are preferably severed from a long or continuous strip, which is fed forward intermittently a distance corresponding to the length of the individual pieces or strips for forming the mouthpieces. The mouthpiece material is provided with a suitable adhesive for causing it to adhere to the cigarette, and such adhesive is preferably applied to the strip of material as it is advanced to the severing means.

The means for feeding the mouthpiece material to the applying mechanism will first be described.

Referring especially to Figs. 1, 2, 3, 4, 6, 11, 12, and 14, the strip of mouthpiece material $x$ is drawn from a web-roll supported by a bracket 70 in the usual manner past guide-rolls 71 and 72 and between feeding-rolls 73 and 74, the feeding-rolls being driven intermittently and at each movement acting to feed the strip a distance corresponding to the length required for a single mouthpiece. The roll 74 is preferably pressed yieldingly against the roll 73, being carried by a swinging bracket 75 and held to duty by a spring 76, and the feed-rolls are geared to rotate together by means of gears 77, 78, 79, 80, and 81. (See Figs. 2 and 3.) For giving the feeding-rolls their intermittent movement the shaft of the roll 73 carries a ratchet-wheel 82, which is rotated by a pawl 83, carried by an arm 84, pivoted concentrically with the ratchet-wheel 82. The arm 84 is oscillated to give the pawl its actuating and return movements by a lever 85, connected to the arm 84 by a link 86 and oscillated by a cam 87 on the shaft 65. (See Figs. 1, 3, and 4.) The feeding-roll 73 is also preferably a pasting-roll, being mounted to rotate partly through a fountain 88 for paste or other adhesive. A freeing-finger 89, extending into a groove in the face of the roll 73, is preferably provided to prevent the strip $x$ clinging to the face of the roll. From the feeding-rolls the strip $x$ is advanced over a guideway 90, a brush 91 being preferably provided to lightly engage the strip to remove surplus paste therefrom. At the end of the guideway 90 means are provided for severing from the strip successive lengths for forming the mouthpieces, such means consisting, preferably, of a lower stationary blade 92 and an upper reciprocating blade 93, the reciprocating blade 93 being carried by a bracket 94, extending from the end of a rod 95, which is reciprocated to give the cutting-blade its cutting and return movement by a cam-groove 96 in the face of a cam-disk 97 on the shaft 30, said rod carrying its at lower end a roll extending into said cam-groove. As the strip is advanced by the feeding-rolls the end of the strip is drawn from the guideway 90 into position to be taken by the applying means by a reciprocating gripper 100. Said gripper is carried by a reciprocating slide 101 and is formed by a stationary gripping-finger 102 and a movable gripping-finger 103, the movable gripping-finger being pivotally mounted and having a rearwardly-extending arm 104. During the return movement of the slide or movement to the right in Fig. 11 the movable gripping-finger 103 is held in its raised position by means of a catch 105 engaging the arm 104 to hold it in the position shown in said figure against the tension of a spring 106. As the slide reaches the end of its return movement the downwardly-extending portion of the catch 105 engages a stationary abutment 107, and the catch is thereby thrown to release the arm 104, whereupon the gripping-finger 103 closes against the finger 102 to grip the end of the strip $x$. The slide and gripper then make their feeding movement, and as the strip is fed forward by the feeding-rolls 73 and 74 the end of the strip is drawn from the end of the guideway 90 by the gripper. As the gripper reaches the end of its feeding movement the arm 104 is engaged by a cam-abutment 108, by which it is depressed and the gripper-arm 103 raised to release the end of the strip $x$, as shown in Fig. 11. When the arm 104 is depressed to this position, the catch 105 again snaps over it to hold the gripping-finger 103 raised during the next return movement of the gripper. The slide 101 is reciprocated by a lever 110, connected to the slide by a link 111 (see Figs. 2, 3, and 4) and oscillated against the tension of a spring 112 by a cam 113, mounted on a short shaft 114 and driven from the shaft 65 by a sprocket-chain 115, the sprocket-wheels of said chain being of equal size so that the cam 113 will make one rotation for each rotation of the shaft 65. To grip the end of the strip $x$ of mouthpiece material, the end of the gripping-finger 102 must pass over the knife-edge 92. The end of the guideway 90 must therefore support the end of the strip $x$ a sufficient distance above the knife-blade 92 to insure the end of the strip entering between the gripping-fingers. It is desirable, however, that at the time of severing the strip the strip should lie quite close to the knife-blade 92. The end of the guideway 90 is therefore preferably arranged so as to be raised slightly at the time the end of the strip is engaged by the gripper and then lowered to bring the strip into position to be severed. For this purpose a portion $90^a$ of the guideway is preferably formed in a movable block 120, pivoted at a point such that by swinging the block on its pivot the end of the guideway may be raised. For operating the block in time with the movements of the gripper it is provided with an arm 121, (shown by dotted lines in Fig. 11,) which carries a pin extending into a cam-slot 122 formed in an extension of the slide 101. This slot 122 is so formed that at the time the knife-blade 93 descends to sever a portion from the strip $x$ the block 120 lies in the position shown in Fig. 11, and before the gripper has been moved into position to grasp the end of the strip the block is swung upward to raise the end of the strip, as shown in Fig. 14. The bottom of the guideway near its end is preferably perforated, as shown at 123, to communicate with a suction-chamber 124. The suction through the openings 123 serves to hold the end of the strip flat in the guideway 90, so that the extreme end of the strip extending beyond the guideway will be in position to be grasped by the gripper. When the end portion of the guideway is formed in a movable block, as shown, the block may be chambered and the chamber in the block connected in any suitable manner with the suction-chamber 124—as, for example, by a neck 125—with which the block makes a sliding connection, as shown.

The mouthpiece-applying mechanism comprises means for raising the severed portion of the mouthpiece material against the projecting end of the cigarette, supported by the carrier 20, and means for folding the extending portions of the mouthpiece material about the cigarette. Such applying mechanism will now be described.

The strip or piece of mouthpiece material to be applied to a cigarette is raised against the under side of the cigarette by a vertically reciprocating support 130, over which when it is in its lowered position (shown in Figs. 10 and 11) the end of the strip of mouthpiece material is drawn by the gripper. After the knife-blade 93 has descended to sever the piece from the strip the support is moved upward to bring the central portion of the strip against the under side of the projecting end of the cigarette carried by the support 20, as shown in Fig. 13. The central portion of the face of the support 130 is preferably recessed to a form corresponding to one side of the cigarette, so that the mouthpiece material will be applied by the support over substantially one-half of the circumference of the cigarette. Such recessed portion of the face of the support 130 is preferably perforated, as shown at 131, the perforations opening to a chamber or passage 132 in the support, which is put in communication with the suction-chamber 124 after the strip of mouthpiece material has been fed to position on the support. The mouthpiece material will thus be sucked down against the curved face of the support, and thereby held in position on the support during its upward movement and in form to be applied to the cigarette. The mouthpiece material will thus be applied to all that portion of the cigarette corresponding to the recessed portion of the support without any considerable pressure being exerted against the cigarette. The support 130 is carried by a hollow slide 133, which is mounted to slide vertically on guideways on the face of a suction-box 134, the interior of which forms the suction-chamber 124. The slide 133 is also guided by an arm 135, which extends through a guide-opening in the vertical supporting-plate 136, and the arm 135 carries an antifriction-roll 137, which runs in a cam-groove 138 in the cam-disk 64, whereby the slide is reciprocated to raise and lower the support 130.

The chamber 132 of the support 130 communicates with the interior of the hollow slide 133, which is in communication with the suction-chamber 124 through openings in the adjacent walls of the slide and suction-box, one of said openings being of sufficient length to maintain the communication between the chambers for all positions of the slide, and the opening in the wall of the suction-box being controlled by a valve 139, by which the valve-opening is closed after the support has been raised and opened for securing the next piece of mouthpiece material to the support. The valve 139 is carried by a rock-shaft 140, which is rocked to operate the valve by a pitman 141, connected at one end to an arm on the shaft 140 and having its other end forked to straddle the shaft 30 and carrying a cam-roll running in a cam-groove 142 in the face of the cam-disk 97.

For folding the extending portions of the piece of mouthpiece material upward about the cigarette, folding-rods 145 and 146 are provided, mounted to reciprocate vertically through openings in the support 130, one or more on either side of the concave portion of the support. Such folding-rods extend downward through the slide 133, and their lower ends are secured to a sliding head 147, mounted to slide on a downward extension of the slide 133, being supported thereon by a collar 148 and movable upward thereon against the tension of a spring 149. The sliding head 147 carries a downwardly-extending rod 150, the lower end of which is forked to straddle the cam-shaft 30 and carries a roll in position to be engaged by a cam 151 on the shaft 30. When the support 130 is moved upward to raise the mouthpiece material against the cigarette, the sliding head 147 is carried upward with the slide, the rods thus moving upward with the support in the relative position thereto shown in Fig. 11. The sliding head 147 is then raised against the tension of the spring 149 by the cam 151, and the end of the folding-rod 145 is projected above the face of the support 130, thereby folding one of the extending portions of the mouthpiece material upward, as shown in Fig. 15. The folding-rod 146 is shorter than the rod 145, so that it does not project above the face of the support when the rods are in the position shown in Fig. 15. The upwardly-extending end of the mouthpiece material is then folded down over the cigarette by suitable folding means, such as will be hereinafter described, and the sliding head 147 is then moved farther upward by the cam 151 to move the folding-rods up to the position shown in Fig. 16, whereby the other extending end of the mouthpiece material is bent upward, as shown in said figure. Such upwardly-extending end of the mouthpiece material is then folded down on the cigarette and its edge lapped over the edge of the previously-folded end, as shown in Fig. 17.

The support 130 is preferably provided with upwardly-extending plates 152 and 153, which serve as guide for the piece of mouthpiece material, the plate 153 being cut away centrally for a distance corresponding to the width of the cigarette and the plate 152 extending upward, so as to form a stop for the end of the cigarette as the latter is advanced into position on the carrier.

Any suitable means may be provided for folding the upwardly-bent ends of the mouthpiece material down against the cigarette. Preferably, however, there is provided, as shown, a pivotally-mounted segmental brush 155, which is oscillated first in one direction to wipe over the top of the cigarette and to fold down one of the upstanding ends of the mouthpiece material, and then in the other direction to fold down the other of such ends. As shown, this brush is mounted on a short shaft 156, which carries a pinion 157, with which meshes a rack 158, carried by a bracket extending from a slide 159, mounted to slide in horizontal guideways on the supporting-plate 136, said slide carrying an antifriction-roll running in a cam-groove 160 in the cam-disk 64, (shown by dotted lines in Fig. 6,) whereby the slide is reciprocated to oscillate the brush.

The folding-brush normally stands in the position shown in Figs. 2, 5, 6, 11, and 15. After the folding-rod 145 has been moved upward to the position shown in Fig. 15 the slide 159 is moved to oscillate the brush in the direction of the arrow in Fig. 15 from the position shown in said figure to the position shown in Fig. 16, thereby folding the upwardly-standing end of the mouthpiece material down against the top of the cigarette, as shown in Fig. 16. The cam 151 for actuating the folding-rods is preferably formed as shown, so that as the brush 155 makes its folding movement the folding-rod 145 will be slightly retracted out of the path of the brush. By providing for such retraction of the folding-rod the end of the rod may be moved farther upward in making its folding movement, thus securing a more satisfactory action. The folding-brush having moved to the position shown in Fig. 16, the folding-rods are again projected upward to fold the other end of the mouthpiece material upward, as shown in Fig. 16. The folding-brush is then oscillated in the reverse direction—that is, in the direction of the arrows in Figs. 16 and 17—to fold the second upstanding end of the mouthpiece material down against the cigarette and lap its edge over the edge of the previously-folded end. As the brush makes such second folding movement the folding-rods are retracted out of the path of the brush, as shown in Fig. 17, and after the brush has moved beyond the cigarette the support 130 is moved downward away from the cigarette and into position to receive another length of mouthpiece material. The application of the mouthpiece to the cigarette is thus completed and the applying means returned to position for applying the next length of mouthpiece material to the next cigarette presented by the carrier.

The operation of applying the mouthpiece to the cigarette being completed, the holding-plunger 60 is raised to release the cigarette, and the carrier is moved one step in the direction of the arrows in Figs. 2 and 5 to carry the cigarette from the applying means and to bring another holder 45 into position to receive and support the next cigarette to be tipped. Before the carrier makes such movement the cigarette is preferably moved endwise to bring the end to which the mouthpiece has been applied in position on the carrier, so as to be supported thereby. For this purpose a push-rod 165 is preferably provided, such rod being mounted to reciprocate endwise in an opening extending centrally of the shaft 65 and actuated by means of a lever 166, the lower end of which carries a roll running in a peripheral cam-groove 167 in a cam-disk on the shaft 30. (See Figs. 1, 3, and 4.) The cam 167 is formed to throw the lever so as to project the rod 165 after the mouthpiece has been applied to the cigarette to push the cigarette back onto the carrier, as shown in Fig. 12, the rod being then returned to its normal position, as shown in Fig. 10. The guide-plate 152 is slotted, as shown in Figs. 11 and 13, to provide for the passage of the rod 165.

To prevent overmovement of the cigarettes under the impulse given to them by the rod 165, a stop is provided adjacent to the edge of the carrier toward the feedway 10. This stop is preferably formed by a plate 170, lying between the carrier and the end of the feedway 10 and pivoted at 171 and under the tension of a spring 172, which tends to hold the stop-plate in its operative position. The stop-plate is provided with an arm 173, extending into position to be engaged by a projection 174 on the feeding-finger 16 when the finger moves down into feeding position after making its return movement. The stop-plate will thereby be pressed downward below the plane of the feedway 10 and the pocket 45, lying opposite the feedway, so as not to interfere with the feeding of the cigarette from the feedway to the carrier as the finger 16 makes its feeding movement. The stop-plate will be held depressed during the feeding movement of the finger 16 and until the finger has moved beyond said arm, at which time the cigarette which it is then feeding will have been moved beyond the stop-plate. The stop-plate will then be returned to its operative position by the spring 172 and will remain in such position until after the cigarette has been tipped and moved back onto the carrier by the rod 165. This stop-plate also acts to prevent the cigarette fed to the end of the feedway by the feeding-finger 15 from moving beyond the end of the feedway.

For insuring the adhering of the meeting edges of the strip of mouthpiece material to each other and to the cigarette means are preferably provided for pressing the same against the cigarette for a sufficient time for the setting of the adhesive. Such pressing means is preferably arranged to press the edges of the mouthpiece material against the cigarette while the latter is supported by the carrier after being delivered from the applying means. For this purpose there is preferably provided an endless belt 180, supported by rolls 181 and 182 and a guide-roll 183 for the outer run of the belt. The rolls 181 and 182 are positioned so that the inner run of the belt will extend about a considerable portion of the periphery of the carrier 20, and the tension of the belt is such that when the pockets of the carrier past which the belt extends are filled with cigarettes the belt will bear against the cigarettes with the desired pressure to hold the overlapping edges of the mouthpiece material against the cigarettes without bringing sufficient pressure on the cigarettes to injure the same. The pressure-belt is intended to move with the carrier as it makes its step-by-step movement, and I have found the contact of the mouthpieces with the belt to be sufficient to give the belt the desired movement. It will be seen that the pressure of the belt 180 against the outer side of the mouthpiece will cause the ends of the cigarette to be pressed into the pocket of the carrier, so that the mouthpiece will be pressed against the cigarette throughout the greater portion of its extent.

It is desirable to provide in addition to the pressure-belt 180 means for holding the cigarettes in the pockets of the carrier, and for this purpose a guard 185 is provided, formed by a plate or bar extending about that portion of the carrier about which the belt extends and to one side of the belt, preferably in position to bear against the cigarettes at or near the end not provided with mouthpieces. Between the pressing-belt 180 and the guard 185 the walls of the pockets 45 are preferably extended radially of the carrier, so as to make the pockets deeper to hold the cigarettes more securely in place. Such extension of the walls of the pockets also provides a guide for the holding-plunger 60, as will be seen by referring to Fig. 5, the holding-plunger being formed to enter between such side walls, and thereby be brought to accurate register with the pocket holding the cigarette to be tipped. The holding-plunger will also thus act to hold the carrier accurately in position for each operation of the mouthpiece-applying means.

As each pocket of the carrier is advanced beyond the end of the pressing-belt 180 and the guard 185 the cigarettes contained therein, being unsupported, will drop therefrom and may be received by any suitable receiving means. Preferably, however, there is provided a slow-moving delivery-belt 190, onto which the cigarettes fall and by which they are advanced sidewise and delivered to a suitable receptacle. The delivery-belt 190 is mounted on rolls carried by suitable hangers, as shown in Fig. 2, the shaft of one of which rolls carries a pulley 191, carrying a belt 192, which turns also on a small pulley on a short shaft 193, which also carries a large pulley having a belt 194, turning also on a small pulley on the shaft 30.

It will be understood that although the machine shown is designed for applying mouthpieces or tips to cigarettes of oval or flattened cross-section, and the invention has been made especially with the idea of providing a machine adapted to apply tips to oval cigarettes, yet the invention is not to be limited to the application of tips to oval cigarettes, but may be embodied in machines for operating on cigarettes of round or other form in cross-section. It will be seen that the machine shown will not be affected in its operation by slight differences in size of the cigarette, but will apply the mouthpiece material smoothly and tightly about the end of the cigarette even though the cigarette varies slightly in size from the exact size for which the machine is designed.

It will be understood that the invention is not to be limited to the exact constructions and arrangements of parts to which the foregoing description has been mainly confined, but that it includes various changes and modifications thereof within the claims, and it will be understood also that parts of the invention as claimed may be employed independently of other parts thereof or in connection with other coöperating parts.

What is claimed is—

1. The combination of means for supporting a cigarette, means for applying mouthpiece material about one end of the cigarette while the cigarette is stationarily supported, and means for delivering the cigarette after the mouthpiece material has been applied thereto, substantially as described.

2. The combination of means for supporting a cigarette, means for folding a strip of mouthpiece material about one end of the cigarette while the cigarette is stationarily supported, and means for delivering the cigarette after the mouthpiece material has been applied thereto, substantially as described.

3. The combination of means for supporting a cigarette, means for applying mouthpiece material to one end of the cigarette while the cigarette is stationarily supported, said means including means for applying an intermediate portion of a strip of mouthpiece material to one end of the cigarette and means for folding the extending ends of the strip of mouthpiece material about the cigarette, and means for delivering the cigarette after the mouthpiece material has been applied thereto, substantially as described.

4. The combination of means for supporting a cigarette, means for applying an intermediate portion of a strip of mouthpiece material to one end of the cigarette, means for folding the extending ends of the strip of mouthpiece material about the cigarette while the cigarette is stationarily supported, and means for delivering the cigarette sidewise after the mouthpiece material has been applied thereto, substantially as described.

5. The combination of means for supporting a cigarette, means for folding a strip of mouthpiece material about one end of the cigarette while the cigarette is stationarily supported, and means for delivering the cigarette sidewise after the mouthpiece material has been applied thereto, substantially as described.

6. The combination of means for feeding cigarettes endwise into position to have mouthpiece material applied to one end thereof, means for supporting the cigarettes while the mouthpiece material is applied thereto, means for folding a strip of mouthpiece material about one end of the cigarettes while the cigarettes are stationarily supported, and means for delivering the cigarettes sidewise after the mouthpiece material has been applied thereto, substantially as described.

7. The combination of means for applying mouthpiece material about one end of a cigarette while the cigarette is stationarily supported, means for feeding cigarettes endwise to the applying means, and means for delivering the cigarettes sidewise from the applying means, substantially as described.

8. The combination of means for applying mouthpiece material about one end of a cigarette, means for feeding cigarettes endwise to the applying means, means for delivering the cigarettes sidewise from the applying means, and means for pressing the mouthpiece material against the cigarette during such sidewise movement, substantially as described.

9. The combination of means for supporting a cigarette, means for applying mouthpiece material about one end of the cigarette while the cigarette is stationarily supported, and means for delivering the cigarettes sidewise after the mouthpiece material has been applied thereto, substantially as described.

10. The combination of means for supporting a cigarette, means for applying mouthpiece material about one end of the cigarette, means for delivering the cigarettes sidewise after the mouthpiece material has been applied thereto, and means for pressing the mouthpiece material against the cigarette after the cigarette is delivered from the applying means, substantially as described.

11. The combination of means for supporting a cigarette, means for applying mouthpiece material about one end of the cigarette while the cigarette is stationarily supported, and means for pressing the mouthpiece material against the cigarette after the cigarette is delivered from the applying means, substantially as described.

12. The combination of means for presenting cigarettes successively in position to have mouthpiece material applied to the ends thereof, means for applying mouthpiece material about the ends of the successively-presented cigarettes, means for delivering the cigarettes from the applying means, and means for pressing the mouthpiece material against a cigarette while the applying means is acting to apply mouthpiece material to a succeeding cigarette, substantially as described.

13. The combination of means for supporting a cigarette with one end projecting beyond the supporting means, means for applying mouthpiece material about the projecting end of the cigarette, pressing means for pressing the mouthpiece material against the cigarette, and means for delivering the cigarette from the applying means to the pressing means, substantially as described.

14. The combination of means for supporting a cigarette, means for applying mouthpiece material comprising means for applying an intermediate portion of a strip of mouthpiece material to one end of the cigarette and means for folding the extending ends of the strip of mouthpiece material about the cigarette with the ends overlapping, and means for pressing such overlapping ends against the cigarette after the cigarette is delivered from the applying means, substantially as described.

15. The combination of means for folding a strip of mouthpiece material about the end of a cigarette with the ends overlapping, means for delivering the cigarettes sidewise without rolling after the mouthpiece material has been applied thereto, and a pressing device extending in the direction of such delivery movement of the cigarette in position to engage such overlapping ends of the mouthpiece material to press them against the cigarette as the cigarette is moved sidewise, substantially as described.

16. The combination of means for folding a strip of mouthpiece material about the end of a cigarette with the ends overlapping, means for delivering the cigarettes sidewise without rolling after the mouthpiece material has been applied thereto, and an endless belt adapted to move in engagement with such overlapping ends of the mouthpiece material as the cigarette is moved sidewise, substantially as described.

17. The combination of a support, means for applying mouthpiece material about the end of a cigarette carried by said support, said means including means for applying an intermediate portion of a strip of mouthpiece material to the cigarette and means for folding the extending ends of the strip about the cigarette, and means for causing a relative movement between said support and the applying means for delivering the cigarette from the applying means, substantially as described.

18. The combination of a support, means for applying mouthpiece material about the end of a cigarette carried by said support, said means including means for applying an intermediate portion of a strip of mouthpiece material to the cigarette and means for folding the extending ends of the strip about the cigarette, and means for causing a relative movement between said support and the applying means transversely of the cigarette for delivering the cigarette from the applying means, substantially as described.

19. The combination of a support, means for applying mouthpiece material about one end of a cigarette carried by said support, said means including means for applying an intermediate portion of a strip of mouthpiece material to the cigarette and means for folding the extending ends of the strip about the cigarette, and means for moving the support to carry the cigarette from the applying means, substantially as described.

20. The combination of a support, means for applying mouthpiece material about the end of a cigarette carried by said support, said means including means for applying an intermediate portion of a strip of mouthpiece material to the cigarette and means for folding the extending ends of the strip about the cigarette, and means for moving the support to carry the cigarette sidewise from the applying means, substantially as described.

21. The combination of a support, means for applying mouthpiece material about the end of a cigarette carried by the support, means for moving the support to carry the cigarette from the applying means, and means for pressing the mouthpiece material against the cigarette after the cigarette has been moved from the applying means and while carried by the support, substantially as described.

22. The combination of a support, means for positioning a cigarette on the support with the end of the cigarette extending beyond the support, means for applying mouthpiece material about the end of the cigarette, means for moving the cigarette endwise after the mouthpiece material has been applied thereto to bring said end of the cigarette on the support, and means for moving the support to carry the cigarette sidewise from the applying means, substantially as described.

23. The combination of a support, means for positioning a cigarette on the support with the end of the cigarette extending beyond the support, means for applying mouthpiece material about the end of the cigarette, means for moving the cigarette endwise after the mouthpiece material has been applied thereto to bring said end of the cigarette on the support, means for moving the support to carry the cigarette sidewise from the applying means, and means for pressing the mouthpiece material against the cigarette after the cigarette has been moved from the applying means and while carried by the support, substantially as described.

24. The combination of a support, means for positioning a cigarette on the support with the end of the cigarette extending beyond the support, and means for applying an intermediate portion of a strip of mouthpiece material to the projecting end of the cigarette and for folding the extending ends of the strip about the cigarette, substantially as described.

25. The combination of a carrier for holding a plurality of cigarettes, means for applying mouthpiece material about one end of the cigarettes while the cigarettes are supported by the carrier, and means for pressing the mouthpiece material against the cigarettes after they have been carried beyond the applying means and while still supported by the carrier, substantially as described.

26. The combination of an intermittently-moving carrier for holding a plurality of cigarettes, means for feeding cigarettes to the carrier in position to have mouthpiece material applied to one end of the cigarettes, means for applying mouthpiece material about one end of the cigarettes while supported by the carrier, and means for pressing the mouthpiece material against the cigarettes after they have been carried beyond the applying means, substantially as described.

27. The combination of an intermittently-moving carrier for holding a plurality of cigarettes, means for feeding cigarettes to the carrier in position to have mouthpiece material applied to one end of the cigarettes, and means for applying mouthpiece material about one end of the cigarettes while stationarily supported by the carrier, substantially as described.

28. The combination of an intermittently-rotating carrier for moving a plurality of cigarettes sidewise, means for applying a strip of mouthpiece material about one end of the cigarettes while supported by the carrier, and means for pressing the mouthpiece material against the cigarettes after they have been carried beyond the applying means, substantially as described.

29. The combination of means for moving a succession of cigarettes sidewise intermittently, means for applying mouthpiece material about one end of each cigarette, and means for pressing the mouthpiece material against the cigarettes after they have been moved beyond the applying means, substantially as described.

30. The combination of means for moving a succession of cigarettes sidewise intermittently, means for applying mouthpiece material about one end of each cigarette, and means moving with the cigarettes for pressing the mouthpiece material against the cigarettes after they have been moved beyond the applying means, substantially as described.

31. The combination with means for applying mouthpiece material about one end of a cigarette, an intermittently-moving carrier by which the cigarettes are moved sidewise after having the mouthpiece material applied thereto, and means for pressing the mouthpiece material against the cigarette while the cigarette is being advanced by said carrier, substantially as described.

32. The combination of a feedway, a carrier adapted to move transversely to the feedway and having a plurality of pockets for receiving cigarettes from the feedway, means for moving the carrier intermittently to bring the pockets successively into position to receive cigarettes from the feedway, means for advancing cigarettes endwise from the feedway to the pockets of the carrier, and means for applying mouthpiece material about the ends of the cigarettes while supported by the carrier, substantially as described.

33. The combination of the feedway 10, feed-board 11, reciprocating feeding-finger 12, means for retracting the feeding-finger during its return movement, and feeding means for advancing through the feedway the cigarettes fed by the finger 12, substantially as described.

34. The combination of a feedway, a carrier adapted to move transversely to the feedway and having a plurality of pockets for receiving cigarettes from the feedway, means for moving the carrier intermittently to bring the pockets successively into position to receive cigarettes from the feedway, means for feeding cigarettes endwise from the feedway to the carrier and into position with the end of the cigarette extending beyond the carrier, means for applying mouthpiece material about the end of the cigarette, means for moving the cigarette endwise after the mouthpiece material has been applied thereto to bring said end of the cigarette on the carrier, a stop between the carrier and the feedway for limiting such endwise movement of the cigarette, and means for moving said stop out of the path of the cigarettes during the feeding of the cigarettes to the carrier, substantially as described.

35. The combination of a feedway, a support, means for advancing a cigarette endwise from the feedway onto the support, means for applying mouthpiece material about the end of the cigarette, means for moving the cigarette endwise in the reverse direction after the mouthpiece material has been applied thereto, a stop between the feedway and the support for limiting such reverse movement of the cigarette, and means for moving said stop to permit cigarettes to be fed from the feedway to the support, substantially as described.

36. The combination of an intermittently-moving carrier having a plurality of open pockets for holding cigarettes, means for applying mouthpiece material about the ends of cigarettes supported by the carrier, and a holding device for coacting with the pockets successively to hold the cigarettes therein when in position to have mouthpiece material applied thereto, substantially as described.

37. The combination of an intermittently-moving carrier having a plurality of open pockets for holding cigarettes, means for applying mouthpiece material about the ends of cigarettes supported by the carrier, and a reciprocating holding-plunger 60 for coacting with the pockets successively to hold the cigarettes therein when in position to have mouthpiece material applied thereto, substantially as described.

38. The combination of an intermittently-moving carrier having a plurality of open pockets for holding cigarettes, means for applying mouthpiece material about the ends of cigarettes supported by the carrier, and a holding device for coacting with the pockets successively to hold the cigarettes therein when in position to have mouthpiece material applied thereto, the carrier and the holding device being provided with parts formed to secure the exact positioning of the pockets with relation to the applying means and the holding device, substantially as described.

39. The combination of an intermittently-moving carrier having a plurality of open pockets for holding cigarettes, means for applying mouthpiece material about the ends of cigarettes supported by the carrier, and a holding device for coacting with the pockets successively to hold the cigarettes therein when in position to have mouthpiece material applied thereto, the holding device being formed to engage the side walls of the pockets, substantially as described.

40. The combination of means for presenting cigarettes successively in position to have mouthpiece material applied to the ends thereof, means for feeding a strip of mouthpiece material intermittently, means for severing pieces therefrom, means for applying an intermediate portion of such pieces of mouthpiece material to the cigarettes while the cigarettes are stationarily supported, and means for folding the extending ends of the piece of mouthpiece material about the cigarette, substantially as described.

41. The combination of means for supporting a cigarette, a support, means for positioning a piece of mouthpiece material on the support, means for causing a relative movement between the cigarette-supporting means and said support to bring an intermediate portion of the piece of mouthpiece material against the cigarette, and means for folding the extending ends of the piece of mouthpiece material about the cigarette, substantially as described.

42. The combination of means for supporting a cigarette, a support, means for positioning a piece of mouthpiece material on the support, means for raising the support to carry an intermediate portion of the piece of mouthpiece material against the cigarette, and means for folding the extending ends of the mouthpiece material about the cigarette, substantially as described.

43. The combination of means for supporting a cigarette, a support having its supporting-face recessed to correspond with the form of one side of the cigarette, means for positioning a piece of mouthpiece material on the support, means for causing a relative movement between the cigarette-supporting means and said support to bring an intermediate portion of the piece of mouthpiece material against the cigarette, and means for folding the extending ends of the piece of mouthpiece material about the cigarette, substantially as described.

44. The combination of means for supporting a cigarette, a support having its supporting-face recessed to correspond with the form of one side of the cigarette, means for positioning a piece of mouthpiece material on the support, means for causing a relative movement between the cigarette-supporting means and said support to bring an intermediate portion of the piece of mouthpiece material against the cigarette, means for folding the extending ends of the piece of mouthpiece material about the cigarette, and suction means connected with perforations in the recessed face of said support whereby the mouthpiece material is drawn into said recess, substantially as described.

45. The combination of means for supporting a cigarette, a support having its supporting-face recessed to correspond with the form of one side of the cigarette, means for positioning a piece of mouthpiece material on the support, means for raising the support to carry an intermediate portion of the piece of mouthpiece material against the cigarette, means for folding the extending ends of the piece of mouthpiece material about the cigarette, and suction means connected with perforations in the recessed face of the support whereby the mouthpiece material is drawn into the recess and held in position on the support during its upward movement, substantially as described.

46. The combination of means for supporting a cigarette, a support, means for positioning a piece of mouthpiece material on the support, means for raising the support to carry an intermediate portion of the piece of mouthpiece material against the cigarette, folders carried by the support for folding the extending ends of the piece of mouthpiece material upward, and means for folding such upturned ends down on the cigarette, substantially as described.

47. The combination of means for supporting a cigarette, a support, means for positioning a piece of mouthpiece material on the support, means for raising the support to carry an intermediate portion of the piece of mouthpiece material against the cigarette, folders carried by the support for folding the extending ends of the piece of mouthpiece material upward, means for operating said folders successively, and means for folding such upturned ends down on the cigarette, substantially as described.

48. The combination of means for supporting a cigarette, a support, means for positioning a piece of mouthpiece material on the support, means for raising the support to carry an intermediate portion of the piece of mouthpiece material against the cigarette, folding-rods mounted to reciprocate through the face of the support, means for operating said rods to fold the extending ends of the piece of mouthpiece material upward successively, and means for folding such upturned ends down on the cigarette, substantially as described.

49. The combination of means for supporting a cigarette, means for applying an intermediate portion of a piece of mouthpiece material to the cigarette while the cigarette is supported by said means, folders for folding the extending ends of the piece of mouthpiece material upward, and other means for folding such upturned ends down on the cigarette, substantially as described.

50. The combination of means for supporting a cigarette, means for applying an intermediate portion of a piece of mouthpiece material to the cigarette while the cigarette is supported by said means, folders for folding the extending ends of the piece of mouthpiece material upward successively, and other means for folding the upturned ends of the piece of mouthpiece material down on the cigarette, substantially as described.

51. The combination of means for supporting a cigarette, means for applying an intermediate portion of a piece of mouthpiece material to the cigarette, folders for folding the extending ends of the piece of mouthpiece material upward successively, and a reciprocating folder for folding the upturned ends of the piece of mouthpiece material down on the cigarette, said folder acting to fold one of such upturned ends down as it moves in one direction and the other as it moves in the other direction, substantially as described.

52. The combination of means for supporting a cigarette, means for applying an intermediate portion of a piece of mouthpiece material to the cigarette, folders for folding the extending ends of the piece of mouthpiece material upward successively, and an oscillating folder for folding the upturned ends of the piece of mouthpiece material down on the cigarette, said folder acting to fold one of such upturned ends down as it moves in one direction and the other as it moves in the other direction, substantially as described.

53. The combination of means for supporting a cigarette, means for applying an intermediate portion of a piece of mouthpiece material to the cigarette, folders for folding the extending ends of the piece of mouthpiece material upward successively, and a reciprocating brush for folding the upturned ends of the piece of mouthpiece material down on the cigarette, said brush acting to fold one of such upturned ends down as it moves in one direction and the other as it moves in the other direction, substantially as described.

54. The combination of means for supporting a cigarette, means for applying an intermediate portion of a piece of mouthpiece material to the cigarette, folders for folding the extending ends of the piece of mouthpiece material upward successively, and an oscillating segmental brush for folding the upturned ends of the piece of mouthpiece material down on the cigarette, said brush acting to fold one of such upturned ends down as it moves in one direction and the other as it moves in the other direction, substantially as described.

55. The combination of means for supporting a cigarette, means for applying an intermediate portion of a piece of mouthpiece material to the cigarette, folders for folding the extending ends of the piece of mouthpiece material upward, a reciprocating folder for folding the upturned ends of the piece of mouthpiece material down on the cigarette, means for actuating said folders for folding the ends of the piece of mouthpiece material upward whereby one of said folders is moved to fold its end of the piece of mouthpiece material upward before the reciprocating folder moves in one direction and is then retracted out of the path of the reciprocating folder and the other of said folders is moved to fold its end of the piece of mouthpiece material upward before the reciprocating folder moves in the other direction and is then retracted out of the path of the reciprocating folder, substantially as described.

56. The combination of means for supporting a cigarette, the support 130, folding-rods 145 and 146 mounted in said support, means for actuating said folding-rods substantially as described, and a reciprocating folder for folding the upturned ends of the piece of mouthpiece material down on the cigarette, substantially as described.

57. The combination with means for supporting a cigarette, and means for applying mouthpiece material about the end of the cigarette, of means for feeding a strip of mouthpiece material intermittently, a support over which the strip of mouthpiece material is fed, a reciprocating gripper for drawing the end of the strip from the support and into position to be taken by the applying means, severing means beyond the support, and means for raising the support to present the end of the strip in position to be grasped by the gripper, substantially as described.

58. The combination with means for supporting a cigarette, and means for applying mouthpiece material about the end of the cigarette, of means for feeding a strip of mouthpiece material intermittently, a support over which the strip of mouthpiece material is fed, a reciprocating gripper for drawing the end of the strip from the support and into position to be taken by the applying means, severing means beyond the support, and suction means connected with perforations in the face of the support, substantially as described.

59. The combination of means for feeding a strip of material, a support over which the strip of material is fed, a reciprocating gripper for drawing the end of the strip from the support, severing means beyond the support, and means for raising the support to present the end of the strip in position to be grasped by the gripper, substantially as described.

60. The combination of means for feeding a strip of material, a support over which the strip of material is fed, a reciprocating gripper for drawing the end of the strip from the support, severing means beyond the support, and suction means connected with perforations in the face of the support, substantially as described.

61. The combination of means for feeding a strip of material, a support over which the strip of material is fed, a reciprocating gripper for drawing the end of the strip from the support, severing means beyond the support, suction means connected with perforations in the face of the support, and means for raising the support to present the end of the strip in position to be grasped by the gripper, substantially as described.

62. The combination of a support for the end of a strip of material, a reciprocating gripper for drawing the end of the strip from the support, a lower stationary cutting-blade beyond the end of the support, an upper coacting reciprocating cutting-blade, and means for raising the support to present the end of the strip in position to be grasped by the gripper, substantially as described.

63. The combination of a support for the end of a strip of material, a gripper for drawing the end of the strip from the support, suction means connected with perforations in the face of the support, means for applying adhesive to the strip as it is advanced to the support, and a severing device beyond the support, substantially as described.

64. The combination of the pivoted support 130 having its supporting-face provided with suction-perforations, a suction-chamber, movable severing-blade 93, coacting severing member, reciprocating gripper 100, and means for raising the support 120 as the gripper moves into position to grasp the end of a strip of material extending from the support, substantially as described.

65. The combination of an endless carrier adapted to support a plurality of cigarettes arranged transversely of the carrier, means for folding a strip of mouthpiece material about cigarettes supported by the carrier, means for holding the cigarettes on the carrier after being carried beyond the folding means, and means for receiving the cigarettes from the carrier, substantially as described.

66. The combination of means for feeding cigarettes successively into position to have mouthpiece material applied about the ends thereof, means for folding a strip of mouthpiece material about the ends of the cigarettes, an endless carrier adapted to support a plurality of cigarettes arranged transversely of the carrier and by which the cigarettes are delivered from the folding means, means for holding the cigarettes on the carrier, and means for receiving the cigarettes from the carrier, substantially as described.

67. The combination of a rotary carrier having a plurality of peripheral pockets arranged transversely to the direction in which they are moved by the rotation of the carrier, means for applying mouthpiece material about the ends of cigarettes supported in said pockets, a guard extending about the carrier beyond the applying means in the direction of the movement of the carrier for holding the cigarettes in the pockets, and means for receiving the cigarettes from the carrier when they have been carried beyond the said guard, substantially as described.

68. The combination of a rotary carrier having a plurality of peripheral pockets arranged transversely to the direction in which they are moved by the rotation of the carrier, means for applying mouthpiece material about the ends of cigarettes supported in said pockets, and a pressing device extending about the carrier beyond the applying means to bear against the mouthpieces as the cigarettes are advanced by the carrier from the applying means, substantially as described.

69. The combination of a rotary carrier having a plurality of peripheral pockets arranged transversely to the direction in which they are moved by the rotation of the carrier, means for folding a strip of mouthpiece material about the ends of cigarettes supported in said pockets, means for holding the cigarettes in the pockets of the carrier after they have been carried beyond the folding means, and a delivery-belt 190 onto which the cigarettes drop from the carrier, substantially as described.

70. The combination of the rotary carrier 20 having peripheral recesses 45 forming pockets for holding cigarettes, means for applying mouthpiece material about the ends of cigarettes in said pockets, and a guard 185 and pressing-belt 180 extending about the carrier beyond the applying means, substantially as described.

71. The combination of the carrier 20 having peripheral recesses 45 forming pockets for holding cigarettes, means for applying mouthpiece material about the ends of cigarettes in said pockets, a guard 185 and pressing-belt 180 extending about the carrier beyond the applying means, and a delivery-belt 190, substantially as described.

72. The combination of the carrier 20 having peripheral recesses 45 forming pockets for holding cigarettes, means for applying mouthpiece material about the ends of cigarettes in said pockets, and a pressing-belt 180 and guard 185 extending about the carrier beyond the applying means, the walls of the recesses 45 being extended radially of the carrier between the pressing-belt and the guard, substantially as described.

In testimony whereof I have hereunto set my hand in the presence of two subscribing witnesses.

FRANK X. MALOCSAY.

Witnesses:
  A. L. KENT,
  J. A. GRAVES.